3,313,697
CARBAMATE COMPOSITIONS FOR AND METHODS OF TREATING THE CENTRAL NERVOUS SYSTEM
Charles D. Bossinger, Kankakee, and Kelley G. Taylor, Decatur, Ill., assignors to Armour Pharmaceutical Company, Chicago, Ill., a corporation of Delaware
No Drawing. Original application June 26, 1962, Ser. No. 205,202. Divided and this application Aug. 24, 1964, Ser. No. 391,771
10 Claims. (Cl. 167—65)

This invention relates to certain phenyl carbamate compounds which have the phenyl group and the carbamate group attached to the same carbon atom. This invention also relates to a method of treating the central nervous system of animals, i.e., mammals and fowls, especially man and domestic animals by administering these compounds to those animals.

This application is a divisional application of our abandoned application Ser. No. 205,202 filed June 26, 1962, which is a continuation-in-part of copending application Ser. No. 729,554, filed Apr. 21, 1958, and of Ser. No. 38,763, filed June 27, 1960, now abandoned. Application Ser. No. 38,763 was a continuation-in-part of application Ser. No. 729,553, filed Apr. 21, 1958, now abandoned, and applications Ser. Nos. 729,553 and 729,554 were continuations-in-part of parent application Ser. No. 554,132, filed Dec. 20, 1955, now abandoned.

It is an object of this invention to provide carbamate compounds for use in treating the central nervous system which exhibit special and distinctive properties and/or combinations of properties, including tranquilization, sedation, and muscle relaxation. Further objects and advantages will be indicated in the following detailed specification.

The phenyl carbamate compounds which are useful in the treatment of the central nervous system in accordance with the present invention all have the phenyl group and the carbamate group attached to the same carbon atom or the hydroxyalkyl group. More specifically, the carbamate compounds are characterized by the following structural formula:

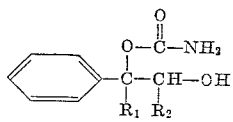

In the foregoing formula, $R_1$ is either hydrogen or an alkyl group containing from 1 to 3 carbon atoms, and $R_2$ is either hydrogen or an alkyl group containing from 1 to 2 carbon atoms. In one preferred sub-class of compounds $R_1$ is hydrogen, and $R_2$ is either hydrogen, methyl or ethyl. Examples of such preferred compounds are 2-hydroxy-1-phenyl ethyl carbamate and 2-hydroxy-1-phenyl butyl carbamate. Other compounds coming within the scope of the present invention are 1-hydroxy-2-phenyl propyl-2-carbamate, 2-hydroxy-3-phenyl pentyl-3-carbamate, and 1-hydroxy-2-phenyl butyl-2-carbamate.

The foregoing compounds can be prepared from organic cyclic carbonates which are formed by reacting a phenyl ethane diol with a dialkyl carbonate or with an alkyl cyclic carbonate. For example, the phenyl ethane diol can be dissolved in the dialkyl carbonate, and this reaction mixture heated to evaporate the hydroxy alkyl reaction by-product. This leaves the organic cyclic carbonate reaction product as the residue. If desired, an alkali catalyst can be used. The cyclic intermediate is a 4-phenyl ethylene carbonate, which is preferably reacted with ammonia to split the carbonate ring and form the desired carbamate. Where the 4-carbon in the ring is bonded to a hydrogen atom as well as to the phenyl group, instead of being bonded to 2-phenyl groups, or an alkyl or cyclohexyl group in addition to the phenyl group, the ring tends to split between the one and two positions, as well as between the two and three positions, thereby resulting in a mixture of isomers, one of which will be the desired phenyl carbamate compound where both the phenyl group and the carbamate group are attached to the same carbon atom. The desired compound can be separated from the other isomer by a differential crystallization. Since the particular process for preparing the phenyl carbamate compounds does not form a part of the present invention, it is not believed it will be necessary to further describe such processes herein, except as illustrated by the following examples.

In utilizing the compounds of this invention for central nervous system treatment, it is preferred to administer the compounds orally. Since the compounds are well-absorbed orally, it will usually not be necessary to resort to parenteral administration. For oral adminisration, it is preferred to combine the phenyl carbamate compounds with a pharmaceutical carrier. The proportions of the carrier and the phenyl carbamate compound are not critical, and they can vary considerably depending on whether the composition is to be filled into capsules or formed into tablets. In tableting, it will usually be desirable to employ at least as much of the pharmaceutical carrier as the phenyl carbamate compound. Various edible pharmaceutical carriers, or mixtures thereof can be used. For example, a mixture of lactose, dibasic calcium phosphate, and cornstarch is suitable. Additional ingredients can be included, such as lubricants like magnesium stearate.

When administering the compounds of this invention orally for central nervous system treatment, the total daily dose will usually fall within the range from 400 to 2,000 milligrams of the phenyl carbamate compound per 24 hour period. Typically, the daily dose will range from 6 to 1,600 milligrams. In some cases, it may sometimes be desirable to administer as much as 2,400 milligrams per day. In practicing the method of this invention, it will therefore be convenient to have the phenyl carbamate compound combined with the pharmaceutical carrier, such as lactose, and prepared in tablets or other dosage unit form. Each tablet or dosage unit can contain from 50 to 600 milligrams of the phenyl carbamate compound. For example, tablets containing 200 milligrams of the phenyl carbamate compound can be administered either 1 tablet three times a day to achieve a daily dose of 600 milligrams, or up to 2 tablets four times a day to achieve a daily dose of 1,600 milligrams.

The present invention is further illustrated by the following specific examples.

*Example 1*

The following method was utilized in preparing 2-hydroxy-1-phenyl ethyl carbamate:

Styrene glycol, in the amount of 100 gms., and propylene carbonate, in the amount of 200 gms., were mixed in a round-bottom flask equipped with a 25 cm. column. The resulting mixture was heated for a period of 3 hours at a bath temperature of 150–160° C. and a pressure of 35 mm.

The reaction system was then heated at a temperature of 150–160° C. at a pressure of 33–38 mm. for a period of 5 hours. During this time a liquid was slowly distilled off having a boiling point of 108° C. at a pressure of 34–35 mm. The pressure of this system was then reduced to 3.5 mm., and the residue fractionally distilled to yield 100 gms. of styrene carbonate having a boiling point of 157° C. at a pressure of 3.5 mm. This product had a melting point of 55–56° C.

This reaction product was subjected to analysis, and the results were as follows.

Calculated: C, 65.84; H, 4.91. Analyzed: C, 65.87, 65.68; H, 5.03, 4.89.

Styrene carbonate, in the amount of 5.0 gms., was mixed with 25 ml. of a concentrated aqueous ammonium hydroxide solution. The resulting mixture was heated for a period of 1 hour on a steam bath, and thereafter the solvent was separated from the reaction product under a stream of air. The separated reaction product was mixed with chloroform, and the resulting mixture distilled to remove chloroform until the last traces of water had been eliminated from the condensate. The residue was crystallized from chloroform. The crystalline reaction product, which was obtained in a yield of 2.0 gms., had a melting point of 112–114° C. The product was 2-hydroxy-2-phenyl ethyl carbamate.

The filtrate separated from the crystalline reaction product was concentrated to dryness and dissolved in ether. The resulting solution was precipitated with Skelly B (petroleum hydrocarbon fraction). This preciptate was recrystallized from chloroform, and the recrystallized product had a melting point of 95–97° C.

The mixed melting point indicates that the recrystallized product was different than the higher melting product. The lower melting product was subjected to spectrophotometric analysis, and its infrared spectrum demonstrated the product to be isometric 2-hydroxy-1-phenyl ethyl carbamate.

*Example II*

1-phenyl-1,2-butanediol 1.52 kg., 20% excess of diethyl carbonate and 1% glycol weight of KOH were placed in a three-necked flask fitting with a mechanical stirrer. The reaction mixture was heated so that the ethanol formed in this reaction was distilled as an azeotrope with diethyl carbonate. After ethanol was stripped off and excess diethyl carbonate removed, the crude cyclic carbonate, after cooling, was mixed with five liters of 28% $NH_4OH$. The reaction mixture was stirred for four hours. Ammonia was then stripped off; the oil was separated. The aqueous layer was extracted twice with two liters of HiTri. The oil was combined with the HiTri extract and dried over anhydrous $Na_2SO_4$. It was filtered and the filtrate was made up to eight liters by adding more HiTri. After chilling in the freezer overnight, P336, 1.1 kg., M.P. 94–7° was collected by filtration. The filtrate was concentrated to near dryness. The residue was crystallized from one liter of HiTri to give a solid, 95 g., M.P. 67° and up. This solid was dissolved in 3 liters of water and allowed to crystallize at room temperature.

The solid formed was filtered and the filtrate was chilled to 5° C. A mixture of needles and plates, 50 g. was isolated by filtration. This crystallization process was repeated using one liter of water. The desired isomer 2-hydroxy-1-phenyl-1-butyl carbamate, 11.5 g., was isolated. It was recrystallized twice from 200 ml. of HiTri to give 8.5 g. of product, M.P. 114–117° C.

*Example III*

Tablets for oral administration were prepared from 2-hydroxy-1-phenyl ethyl carbamate. This compound was combined with a mixed pharmaceutical carrier in the ratio of 2 parts by weight of the carbamate compound per 3 parts of the pharmaceutical carrier. The mixed carrier contained dibasic calcium phosphate as the principal ingredient together with smaller amounts of lactose and 1 part of cornstarch. A small amount of magnesium stearate was also included.

The carbamate compound, the calcium phosphate, the lactose, and part of the magnesium stearate were blended and dry mixed until a uniform composition was obtained. This was formed into firm slugs no greater than ¼ inch thick. The slugs were then put through an oscillating granulator equipped with a 10 mesh screen. The corn-starch and a little more magnesium stearate was added at intervals while the slugs were being sized. The granulation was blended in a drum tumbler for 30 minutes. Following this, the granulation was compressed into tablets of 500 mg. per tablet containing 200 milligrams of the carbamate compound.

While in the foregoing specification this invention has been described in relation to certain preferred embodiments, and many details have been set forth for purpose of illustration, it will be apparent to those skilled in the art that the invention is susceptible to additional embodiments, and that certain of the details set forth herein can be varied considerably without departing from the basic principles of the invention.

We claim:

1. A composition in dosage unit form for treatment of thet central nervous system of an animal to obtain tranquilization, sedation, and muscle relaxation, comprising about 50 to 600 milligrams of a phenyl carbamate compound in admixture with a pharmaceutical carrier, said compound having the structural formula

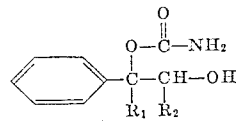

wherein $R_1$ is selected from the class consisting of hydrogen and alkyl containing from 1 to 3 carbon atoms, and $R_2$ is selected from the class consisting of hydrogen and alkyl group containing from 1 to 2 carbon atoms.

2. The composition of claim 1 wherein said compound is 2-hydroxy-1-phenyl ethyl carbamate.

3. The composition of claim 1 wherein said compound is 2-hydroxy-1-phenyl butyl carbamate.

4. The method of treating the central nervous system of an animal to obtain tranquilization, sedation, and muscle relaxation, comprising orally administering to said animal a daily dose of from 6 to 2400 milligrams of a phenyl carbamate compound having the structural formula

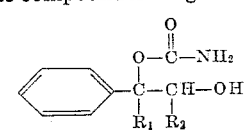

wherein $R_1$ is selected from the class consisting of hydrogen and an alkyl group containing from 1 to 3 carbon atoms, and $R_2$ is selected from the class consisting of hydrogen and an alkyl group containing from 1 to 2 carbon atoms.

5. The method of claim 4 wherein said compound is 2-hydroxy-1-phenyl ethyl carbamate.

6. The method of claim 4 wherein said compound is 2-hydroxy-1-phenyl butyl carbamate.

7. The method of treating the central nervous system of an animal to obtain tranquilization, sedation and muscle relaxation, comprising orally administering to said animal from 400 to 2,400 milligrams per 24 hour period of a phenyl carbamate compound having the structural formula

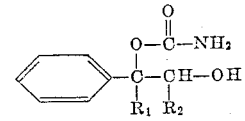

wherein $R_1$ is selected from the class consisting of hydrogen and an alkyl group containing from 1 to 3 carbon atoms, and $R_2$ is selected from the class consisting of hydrogen and an alkyl group containing from 1 to 2 carbon atoms.

8. The method of claim 7 wherein $R_1$ in said structural formula is hydrogen.

9. The method of claim 7 wherein said compound is 2-hydroxy-1-phenyl ethyl carbamate.

10. The method of claim 7 wherein said compound is 2-hydroxy-1-phenyl butyl carbamate.

References Cited by the Examiner

UNITED STATES PATENTS

| | | | |
|---|---|---|---|
| 2,627,524 | 2/1953 | Malkemus | 260—482 |
| 2,656,378 | 10/1953 | Berger et al. | 260—482 |
| 2,724,720 | 11/1955 | Berger et al. | 260—482 |

OTHER REFERENCES

Berger (3): J. Pharm. and Exp. Ther. 104, page 230, 1952.

SAM ROSEN, *Primary Examiner.*

JULIAN S. LEVITT, *Examiner.*